United States Patent [19]

Ross

[11] 3,826,981
[45] July 30, 1974

[54] SOLID-STATE HIGH IMPEDANCE METER SYSTEM

[76] Inventor: Hugh C. Ross, 11915 Shadybrook Ct., Saratoga, Calif. 95070

[22] Filed: Nov. 13, 1972

[21] Appl. No.: 305,721

Related U.S. Application Data

[62] Division of Ser. No. 726,452, May 3, 1968.

[52] U.S. Cl.............................. 324/72.5, 324/149
[51] Int. Cl......................... G01r 31/02, G01r 1/06
[58] Field of Search........................... 324/72.5, 149

[56] References Cited
UNITED STATES PATENTS

| | | | |
|---|---|---|---|
| 2,641,630 | 6/1953 | Goldberger et al.............. | 324/72.5 |
| 2,883,619 | 4/1959 | Kobbe et al. .................... | 324/72.5 |
| 3,256,484 | 6/1966 | Terry............................... | 324/72.5 |

OTHER PUBLICATIONS

"A.C.-D.C. PROBE"; Radio–Electronics; May 1956; pg. 39.
Sherman, J. W.,; "Probes for Profits"; Radio–Electronics; March 1955; pg. 96–97.
"Use of P500 CF..."; Tektronix, Inc. pub; Oct. 1956; 4 pages.

*Primary Examiner*—Alfred E. Smith
*Assistant Examiner*—Ernest F. Karlsen
*Attorney, Agent, or Firm*—John J. Leavitt

[57] ABSTRACT

Presented is a system, including apparatus and methods of operation thereof, for effecting isolated measurement and sensing of line to ground voltages, differential voltages, currents, insulation leakage and resistances, Corona levels, and other parameters in insulated conductors and related systems associated with low and high power, low and high voltage electrical and electronic systems. The system includes a high input impedance meter unit actuated by a solid-state amplifier circuit including a pair of feedback circuits that cooperate with transistor amplifiers to maintain substantially constant the ratio of input and output from the circuit over a wide range of AC and DC voltages and currents. In its different applications, the high input impedance meter including solid-state amplifier circuit is used in conjunction with a variety of probes, both low voltage and high voltage types, for measurements of various voltages, and may be utilized with a proximity probe for direct sensing of AC fields. The high input impedance of the meter movement and solid-state circuit also permits the use of Corona voltage level and detecting probes for both high voltage direct and low voltage indirect or proximity measurement of various levels of voltages. Inasmuch as it is important that systems of this type be predictably accurate and operative, the system also includes a high voltage portable test unit to test the voltmeter and probes. To insure complete reliability of values being measured, the high voltage portable test source itself is subject to test to determine that it is operating properly before it is used to test the voltmeter and probes, and for this purpose a high voltage megohmmeter insulation leakage current-emission detector is provided to test the high voltage portable test voltage source, and to measure the high voltage insulation associated with the high voltage point or terminal being measured. Inasmuch as the high input impedance metering system is used in conjunction with high voltages, a collapsible and detachable insulating "hot stick" is provided to isolate the high voltage components from human contact while in use.

4 Claims, 18 Drawing Figures

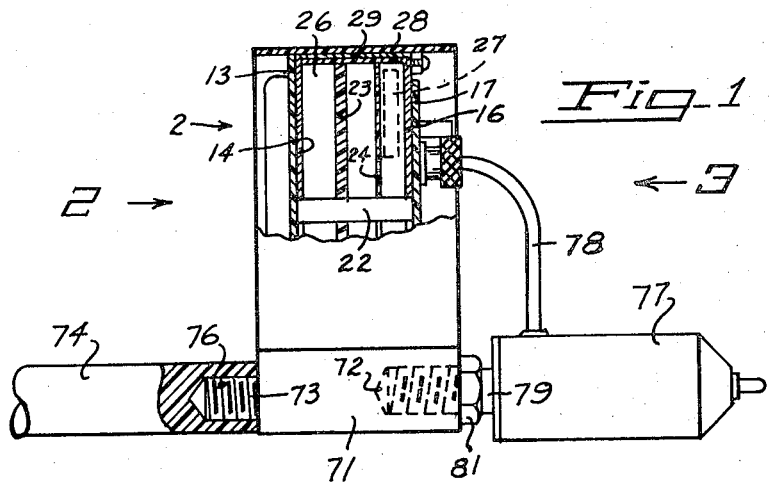
Fig. 1
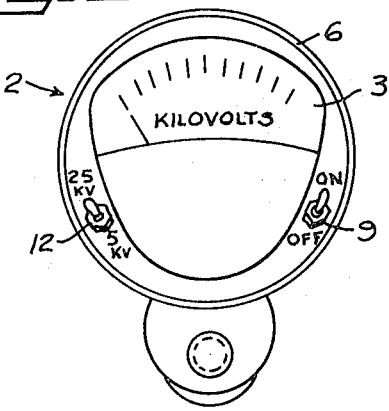
Fig. 2
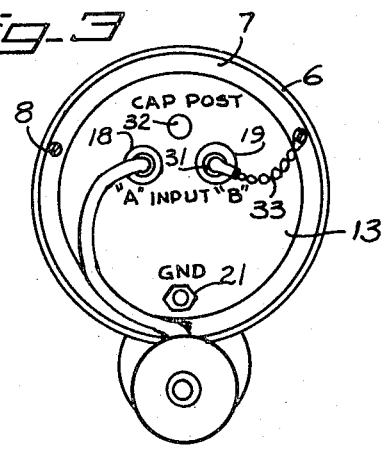
Fig. 3
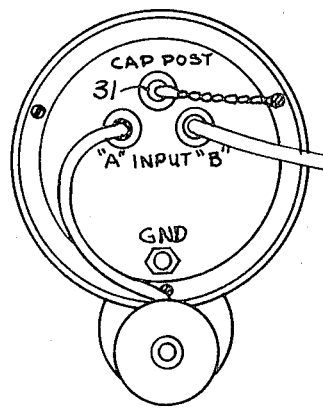
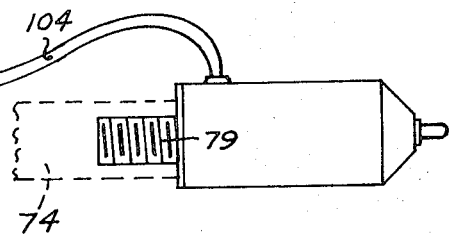
Fig. 4

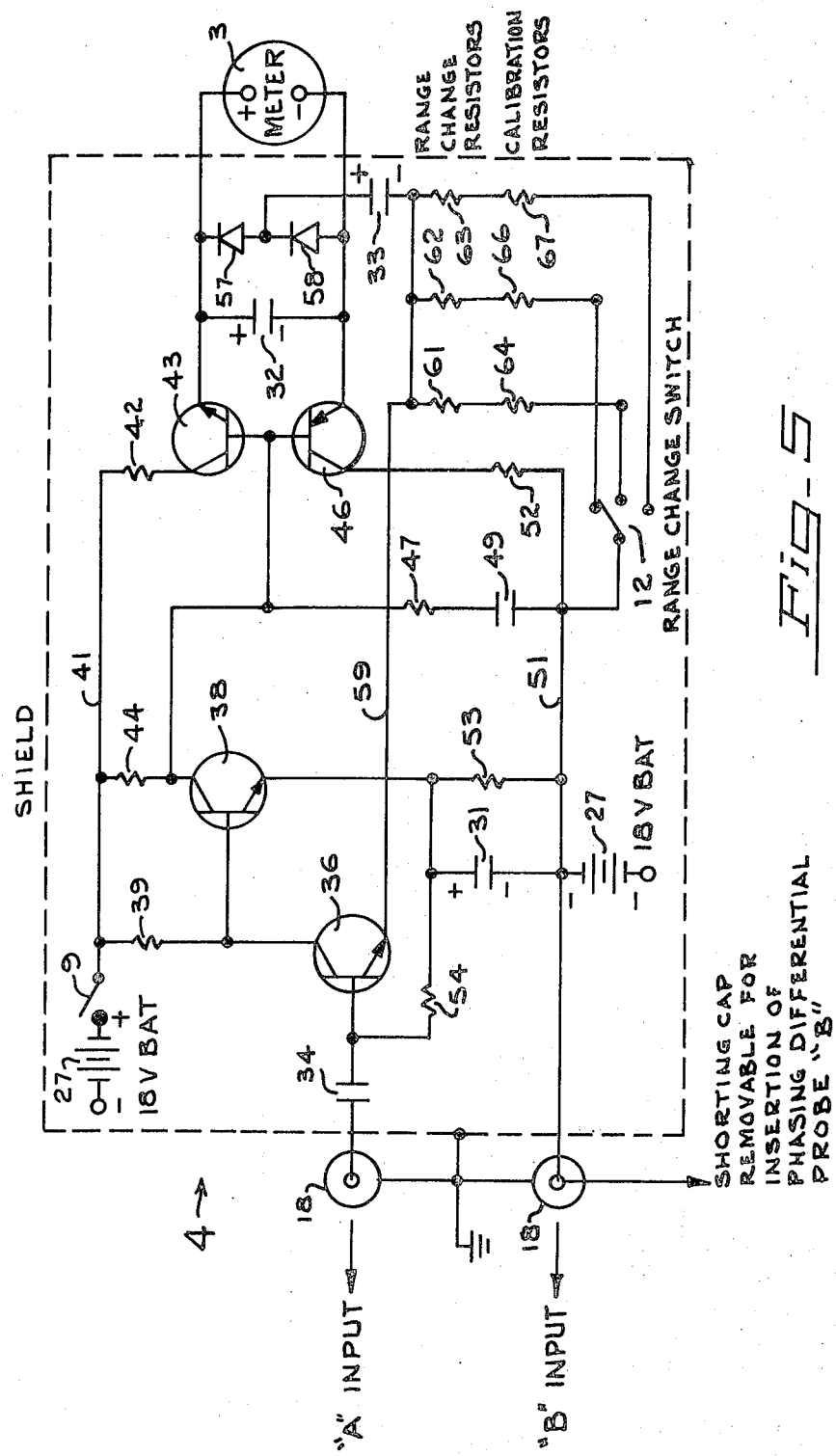

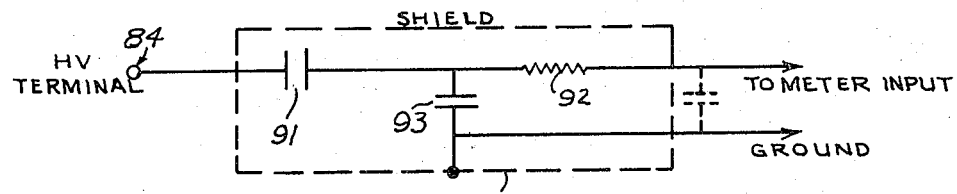
Fig_8
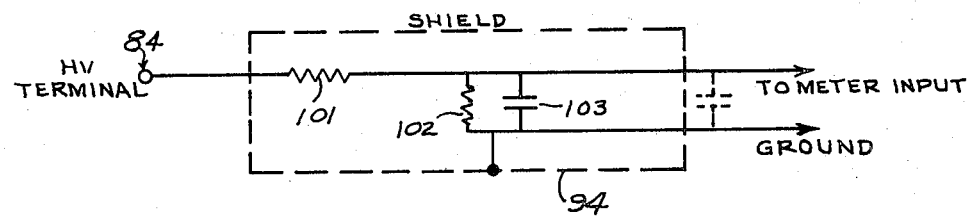
Fig_7
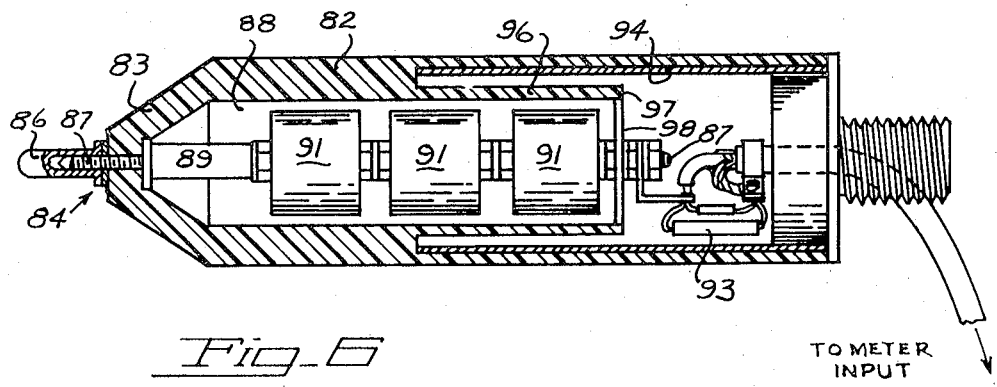
Fig_6

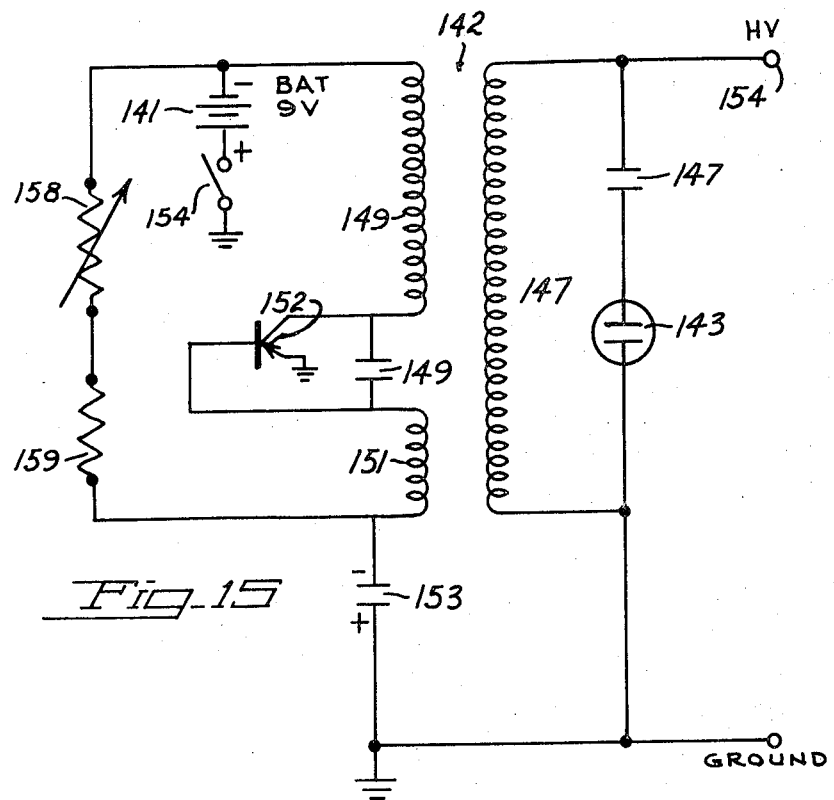
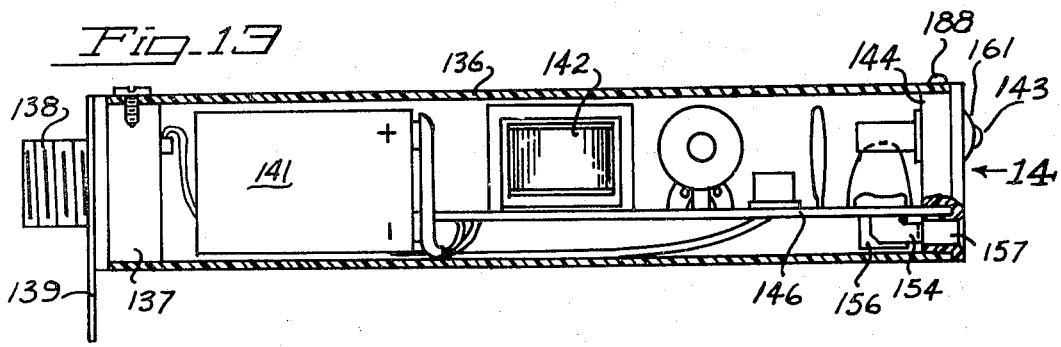
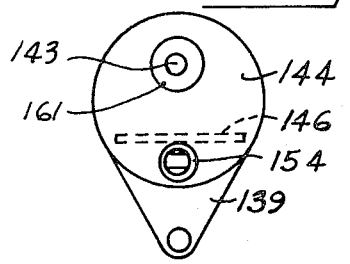

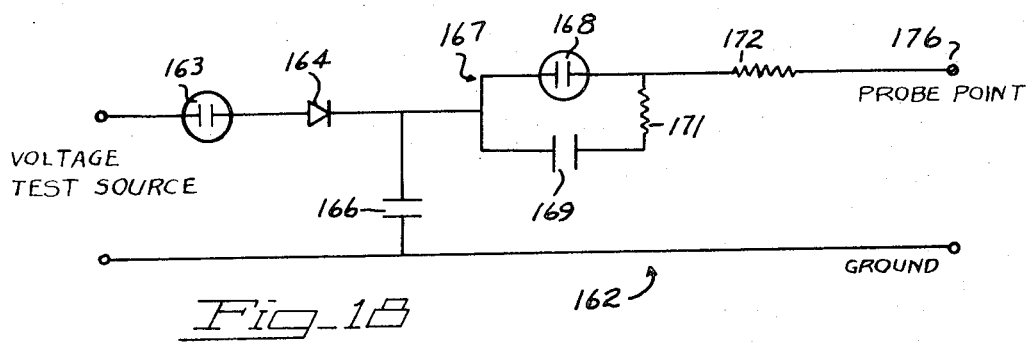
Fig_18
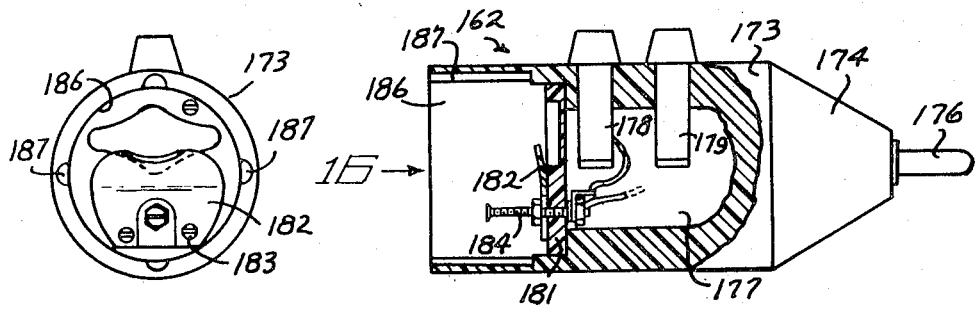
Fig_17  Fig_16

SOLID-STATE HIGH IMPEDANCE METER SYSTEM

This is a division of application Ser. No. 726,452, filed May 3, 1968.

BACKGROUND OF INVENTION

There has been a need in the electrical and electronic industry for a high input impedance metering system to effect measurement and sensing of line to ground voltages, differential voltages, currents, insulation leakages and resistances, Corona levels, and other parameters in insulated conductors and related systems associated with low and high power, low and high voltage systems. The need has been particularly urgent in underground cable installations for power distribution, primarily, because of the inaccessibility of the high voltage inner conductor in such power distribution cables and the relative inaccessibility of the cables. Such a metering system is also of great utility with regard to overhead power lines, and applies with equal pertinency to electronic systems as well as various types of power systems. Accordingly, it is one of the important objects of the invention to provide a high input impedance solid-state metering system designed to accomplish the foregoing results.

Heretofore, metering systems utilizing a relatively high input impedance have been bulky and heavy, and not easily portable. Additionally, such systems are usually not sufficiently stable under varying temperature conditions or source voltage variations to provide accurate measurements. Accordingly, it is a still further object of the present invention to provide a completely portable high input impedance meter that is exceptionally stable under wide temperature and supply voltage variations.

The utilization of a portable high input impedance meter in conjunction with various type probes and test devices has not heretofore been possible because the high input impedance meter did not exist. Accordingly, it is one of the objects of the present invention to provide a high input impedance voltmeter that is completely portable and compatible with hot stick operation of various low and high voltage probe devices used in conjunction with the meter.

Inasmuch as high voltage measurement may impose the risk of electrocution upon the operator of equipment, it is essential that equipment of this type be especially safe, and that means be provided for testing the proper operation of the device prior to its use. Accordingly, it is a still further object of the present invention to provide a high input impedance voltmeter circuit packaged in a way to provide complete shielding of the circuit, including appropriate ground connections.

For accurate measurement, it is essential that the meter unit per se be shielded against stray electrical fields that might cause error in the reading indicated by the meter. Accordingly, it is a still further object of the invention to provide a high input impedance meter in which internal shielding is provided which encloses the entire amplifier circuit so as to shield against such stray electrical fields.

For maximum utilization, it is important that the high input impedance voltmeter be capable of use on the end of a "hot stick." In addition, it is important that auxiliary devices such as low and high voltage probes and test devices of other types be capable of being supported on the voltmeter body in close proximity to the meter movement. Accordingly, it is a still further object of the invention to provide a high input impedance voltmeter arranged to detachably mount a collapsible or segmented insulating "hot stick" together with selected probes.

The invention possesses other objects and features of advantage, some of which, with the foregoing, will be apparent from the following description and the drawings. It is to be understood however that the invention is not limited to the method and means illustrated and described but may be embodied in various forms within the scope of the appended claims.

SUMMARY OF INVENTION

In terms of broad inclusion, the high input impedance metering system of the invention includes a basic high input impedance meter movement or unit driven by a solid-state amplifier. The amplifier is powered by long-life batteries wholly contained within the unit, with appropriate shielding being provided within the unit to protect the meter movement against stray electrical fields in proximity to the meter movement. Novel feedback means are provided in the amplifier circuit to provide exceptional stability under wide temperature and supply voltage variations. The basic meter movement or unit is used in conjunction with a dielectric sectionalized "hot stick" that may be lengthened or shortened at the will of the operator. Additionally, means are provided on the meter body for detachably selecting one or more of low and high voltage probes and other type test devices for use in conjunction with the meter movement. A high voltage portable test source is provided for use in conjunction with the voltmeter to test the proper functioning of the meter before the meter is used to measure low or high voltage circuits. Since it is important that the high voltage portable test source itself be functioning properly when it is applied to test the voltmeter, means are provided for use in conjunction with the high voltage portable test source to test the effectiveness of the test source. This latter means is also effective to test high voltage insulation associated with high voltage terminals.

BRIEF DESCRIPTION OF DRAWINGS

FIG. 1 is a side elevation of the portable voltmeter system, showing the system with one of the probes attached thereto, with the output from the probe being connected to the input of the meter. A portion of the "hot stick" by which the portable voltmeter is supported is broken away to shorten its length.

FIG. 2 is a front elevation of the face of the meter taken in the direction indicated by the arrow 2 in FIG. 1.

FIG. 3 is a rear elevation taken in the direction indicated by the arrow 3 in FIG. 1, and showing the "A" and "B" input terminals to the meter, and illustrating also the manner in which the "B" meter terminal is grounded when not in use.

FIG. 4 is a view similar to FIG. 3, taken in the same direction, and showing the "B" input terminal of the meter connected to a second probe interconnected with the meter input through a relatively long cable. The "hot stick" support for the second probe is shown in dash lines in the view and is broken away to shorten its length.

FIG. 5 is a schematic wiring diagram illustrating the basic high input impedance solid-state amplifier circuit utilized to drive the meter movement.

FIG. 6 is a cross-sectional view through one of the probes used in connection with the voltmeter. Portions of the internal mechanism of the probe are shown in elevation.

FIG. 7 illustrates a diagram from a resistive circuit that may be used in a probe such as the one illustrated in FIG. 6.

FIG. 8 is a diagrammatic view of a capacitive circuit useful in the probe of FIG. 6.

FIG. 13 is a cross-sectional view of a high voltage portable test source for testing the proper operation of the voltmeter and probes.

FIG. 14 is an end view of the high voltage portable test source shown in FIG. 13, taken in the direction of the arrow 14 in FIG. 13.

FIG. 15 is a circuit diagram illustrating the circuit utilized in the high voltage portable test source shown in FIG. 13.

FIG. 16 is a cross-sectional view illustrating the mechanical arrangement of components in a high voltage megohmmeter and leakage detector utilized in conjunction with the high voltage portable test source to test the proper operation of the portable test source.

FIG. 17 is an end view taken in the direction indicated by the arrow 17 in FIG. 16 and illustrating the high voltage input and ground terminals of the high voltage megohmmeter and leakage detecter.

FIG. 18 is a wiring diagram for the high voltage megohmmeter and leakage detecter illustrated in FIG. 16.

DESCRIPTION OF PREFERRED EMBODIMENT

Figure 9:
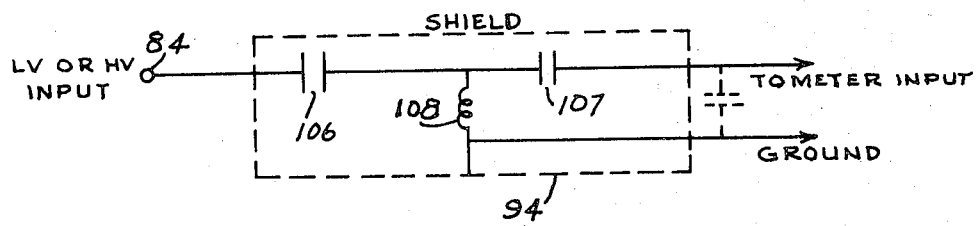
FIG. 9 is a diagrammatic view of a circuit, illustrating the interconnection of the various components, which may be used in the probe illustrated in FIG. 6, for the purpose of Corona detection and measurement.

The high input impedance solid-state metering system of the invention includes a basic high input impedance meter designated generally by the numeral 2, having a calibrated face 3 calibrated in any desired manner, according to the parameters being measured. Thus, while the meter indicated in FIG. 2 is calibrated in kilovolts, depending on its application, the meter face might be calibrated in megohms or some other appropriate scale. The basic high input impedance meter is driven by a solid-state amplifier circuit designated generally by the numeral 4 in FIG. 5, the circuit being appropriately packaged in a tubular housing 6 (FIGS. 1 through 4) preferably fabricated from a suitable synthetic resinous material having the desirable characteristics of rigidity and dimensional stability. As indicated i FIG. 3, the tubular housing 6 is provided with an annular radially inwardly projecting flange 7 on which the meter 2, including the solid-state amplifier circuit 4, is appropriately rigidly supported by screw 8. As indicated in FIGS. 2 and 3, the meter 2 is provided with the face plate 3, calibrated as previously discussed, and having in addition, a pair of toggle switches 9 and 12 as shown. The toggle switch 9 activates the amplifier circuit when pushed to the "on" position, and deactivates the circuit when pushed to the "off" position. Toggle switch 12 constitutes a range selection switch which may be manipulated to select a 5 kv range for measurement or a 25 kv range as indicated in the drawing. In the interest of brevity, corresponding numbers for toggle switches 9 and 12 have been utilized in the wiring diagram illustrated in FIG. 5.

In order to render the voltmeter as rugged as possible and to provide the requisite shielding to protect the instrument from stray electrical radiation in proximity to the meter, the meter movement is supported on a relatively heavy dielectric plate 13, (FIG. 1) circular in form and proportioned to fit snugly within the inner periphery of the tubular housing 6. Immediately behind the face plate 13 is a relatively thinner conductive metallic shield plate 14 proportioned to essentially cover the entire area of the face plate and to fit snugly within the tubular housing 6. The face plate 13 is rigidly supported in relation to a parallel conductive metallic back plate 16, on which a dielectric face plate 17 is provided and through which project the coaxial input terminals 18 and 19 shown best in FIG. 3. The meter movement is supported in the tubular housing 6 by screws 8 which drive into the metal back plate 16. The metal back plate 16 is thus a ground potential, and is provided with a ground terminal 21 as shown in FIG. 3. Coaxial terminals 18 and 19 are of course rigidly mounted on the metallic plate 16, which is in turn rigidly secured to the face plate 13 through an appropriate dielectric connecting means 22 centrally disposed through the structure. Spaced between the conductive plates 14 and 16 are a pair of dielectric plates 23 and 24, the plate 23 being a printed circuit board on which various components are mounted so as to project into the chamber 26 disposed between the conductive shield plate 14 and plate 23. Dielectric plate 24 is disposed between plate 23 and conductive metallic plate 16, and functions to insulate the printed circuit side of the dielectric plate 23 from other components within the housing, such as batteries 27 that are disposed in the space between dielectric plate 24 and conductive metallic back plate 16.

Circumferentially disposed about the peripheral edges of dielectric plates 23 and 24, is a band 28 of dielectric material which overlaps in its end portions so as to completely enclose the components disposed within the housing. Surrounding the dielectric band 28 is a metallic bank 29 which fits snugly between the peripheral edge portions of conductive metallic plates 14 and 16, preferably in contact therewith, and which in cooperation with conductive shield plates 14 and 16 completely encloses the operative mechanism of the meter movement so as to protect it from stray electrical fields in proximity to the meter movement. There are instances in which it is desirable to use a pair of probes in conjunction with the high input impedance meter to effect line-to-line voltage measurement and to measure differential voltages. In such instances, the cap 31 is removed from the "B" input terminal of the meter, as illustrated in FIG. 3, and is repositioned on the cap support post 32 as illustrated in FIG. 4. It should be noted that in the position of the cap 31 illustrated in FIG. 3, the cap is grounded to the plate 16 through a chain 33.

Referring specifically to FIG. 5, the internal shielding provided by elements 14, 16 and 29 is illustrated schematically in the figure by the dash line that surrounds the wiring diagram. It will thus be seen that the entire circuit, excluding the input terminals 18 and 19 and the meter 3 are completely enclosed within a shielding structure.

It is helpful in the utilization of a high input impedance meter of the type described to be able to check the battery condition with respect to its output capability under load. For this purpose the solid-state amplifier circuit illustrated in FIG. 5 includes a charging current circuit including capacitors 31, 32 and 33, which function at the instant toggle switch 9 is turned to the "on" position to swing the meter needle to a predetermined point on the scale, thus indicating the current and voltage output capability of the battery under load. If the batteries are in good order, the meter needle will swing to near full scale and then return to zero during the initial turn-on with the range finder toggle switch set in the 25 kv. range. If the needle swings to less than 16 kv., the batteries should be changed. In the ordinary course, as soon as the needle has returned to zero the solid-state meter is sufficiently "warmed up."

To insure safety of the operator, the high input impedance voltmeter equipped with a probe suitable for measuring 2.5 kv. circuits, should preferably be used while supported on the end of a 3-foot "hot stick" if the voltmeter is to be hand-held during use. Such a precaution is advisable even though the probe will normally draw less than 10 microamps, generally considered below a dangerous level.

The solid-state amplifier circuit is preferably powered by long-life 18 volt mercury cell batteries 27 and 27', contained within the shielded environment within tubular housing 6. In the circuit, as illustrated best in FIG. 5, a capacitor 34 having a capacitance value of 0.01 mfd. is interposed between the "A" input terminal 18 and the transistor 36 of the NPN type. The collector of transistor 36 is connected to the base terminal of the second NPN type transistor 38 and is connected also through resistor 39 and lead 41 having a second resistor 42 interposed serially therein with the collector terminal of a third NPN type transistor 43. The collector of transistor 38 is also connected through resistor 44 to common lead 41, and as shown, is connected also to the base terminal of transistor 43 and the base terminal of a PNP type transistor 46. The collector terminal of transistor 38 is also connected through a resistor 47 and a capacitor 49 with a common bus 51 that serves to connect the range change toggle switch 12 into the circuit. The bus 51 is also connected to the negative terminal of battery 27' and to the "B" input terminal 19 as shown. Interposed between bus 51 and the collector terminal of PNP transistor 46 is a resistor 52. The emitter of transistor 38 is also connected through a resistor 53 with bus 51, and the base terminal of transistor 36 is likewise connected through a resistor 54 with the emitter terminal of transistor 38 and bus 51.

The output from transistors 43 and 46 is imposed on the meter 3 as shown, the emitter from transistor 43 being applied to the positive terminal of the meter and the emitter of PNP type transistor 46 being applied to the negative terminal of the meter. Appropriate diode rectifiers 56 and 57 are interposed between the positive and negative terminals of the meter as shown, with a feedback circuit 58 being connected between diodes 56 and 57 and including the capacitor 33. The feedback circuit is connected to the emitter terminal of transistor 36 as shown.

To accurately define the range of voltages that may be measured, range change resistors 61, 62, and 63 are provided, each connecting between the feedback circuit 58 and the negative terminal of capacitor 33 with respective terminals of the range change toggle switch 12 as shown. Calibration resistors 64, 66, and 67 are serially interposed between range change resistors 61, 62 and 63, respectively, and the associated range change toggle switch terminals.

In the interest of brevity of description, and believing that the operation of the circuit is obvious from the circuit diagram illustrated in FIG. 5, components having the values indicated in TABLE I below have been found to provide satisfactory operation of the high input impedance voltmeter:

TABLE I

| REFERENCE NO. | DESCRIPTION |
|---|---|
| 34 | 0.01 mfd. |
| 31 | 2.2 mfd. |
| 49 | 22 pf. |
| 32 | 47 mfd. |
| 33 | 68 mfd. |
| 57 | Diode Rectifier |
| 58 | Diode Rectifier |
| 36 | NPN Transistor |
| 38 | NPN Transistor |
| 43 | NPN Transistor |
| 46 | PNP Transistor |
| 54 | 22 megohms |
| 39 | 1 megohm |
| 44 | 100K ohms |
| 53 | 47K ohms |
| 47 | 4700 ohms |
| 42 | 100 ohms |
| 52 | 100 ohms |
| 61 | 16.9K ohms |
| 64 | 432 ohms |
| 62 | 0–50 ohms |
| 66 | 2210 ohms |
| 63 | 0–100 ohms |
| 67 | 0–100 ohms |

The high input impedance voltmeter thus described and contained within the tubular housing 6 is preferably mounted on a junction block 71 fabricated from a synthetic resinous material having desirable dielectric characteristics, and secured to the tubular housing by appropriate screws (not shown). The junction block 71 is provided on one end with a threaded bore 72 and at the other end is provided with a threaded stud 73 by which the voltmeter is mounted on the dielectric "hot stick" 74. The "hot stick" is preferably sectionalized in sections approximately 12 inches long, with one end of each section being provided with a threaded bore 76 as shown in FIG. 1, and the other end of each section being provided with a complementary threaded stud (not shown). A plurality of the sections may then be joined end-to-end to provide a "hot stick" of any desirable length.

The threaded bore 72 in junction block 71 is utilized to detachably mount a probe designated generally by the numeral 77. The probe is connected by a coaxial cable 78 with the "A" input terminal 18 of the meter. To mount the probe 77 securely on the voltmeter, the probe is provided with a threaded stud 79 adapted to threadably engage the bore 72, with a nut 81 being provided to lock the assembly together.

Referring to FIGS. 6, 7, 8 and 9, FIG. 6 illustrates the mechanical construction of a probe utilizing the capacitive circuit illustrated in FIG. 8, while FIG. 7 illustrates the resistive type circuit that may be utilized in the structure illustrated in FIG. 6. FIG. 9 is a circuit which may be utilized in the structure of FIG. 6 and which is effective to detect and measure Corona from high voltage systems. With specific reference to FIG. 6, it will be seen that the probe structure includes an outer dielectric housing 82, having a conical tip 83 as shown through the end of which extends a metallic sensing tip assembly 84. The assembly includes a metallic ferrule 86 that screws onto a bolt 87 extending from inside the hollow chamber 88 within housing 82. Within such chamber, the sensing tip assembly is connected by a sleeve 89 with a series of capacitors 91 as shown. In FIG. 8, the capacitor 91 is shown as connected between the high voltage terminal or sensing tip assembly and the meter input terminal. Serially connected in the circuit between capacitor 91 and the meter input terminal is a resistor 92 as shown. A capacitor 93 is interposed between the high voltage circuit and ground, which in this instance is represented by a shield 94 shown in FIG. 6 to be tubular member within the housing 82 and having a portion that extends about the capacitive and resistive sections of the probe to provide adequate shielding against stray electrical fields.

With regard to values of components 91, 92, and 93, it has been found that a range of capacitance from approximately 8 micro-microfarads to 300 micro-microfarads for capacitor 91 will operate satisfactorily when the value of resistor 92 is selected at between 20 to 300 megohms. The value of capacitor 93 is selected in accordance with the ratio of division desired, usually a ratio of 1,000–1 being preferred.

With respect to the resistive circuit illustrated in FIG. 7, it is intended that this circuit be mounted within the same type structure illustrated in FIG. 6, the housing 82 being provided with a re-entrant skirt portion 96 extending into the tubular shield 94 over a portion of its length, and providing at its outer end 97 a measure of lateral stability by virtue of the dielectric ring 98 supported on the threaded bolt 87 and extending between the bolt and the inner periphery of the re-entrant tubular portion 96. It will thus be seen that this mechanical arrangement of parts within the probe structure supports the various components in a rigid and sturdy manner. When the resistive circuit of FIG. 7 is substituted for the capacitive circuit of FIG. 8, a resistor 101 having a nominal value of approximately 20 to 300 megohms is provided, matched with resistor 102 which provides a division ratio of approximately 1,000 to 1. Capacitor 103, connected between the meter input circuit and ground has a value determined by the frequency range it is desired to pass to ground. For instance, when used as a low pass filter for 60-cycle current, the value may be set at approximately 1,000 picofarads. This capacitor also functions to bypass overvoltage transients, and thus serves to protect the meter against such transients. It will of course be apparent that the value of the capacitor 103 maybe modified in order to pass high frequency rather than low frequencies.

It will be apparent from FIG. 4, there where it is desired, a pair of such probes as described above may be utilized, for instance when the voltmeter is used for line-to-line or phasing differential measurements. To effect such line-to-line measurements, the cap is removed from the "B" input terminal of the meter, and the cable 104 is connected to such terminal. The terminal cap is supported on cap supporting post 31 as previously explained. With the meter either grounded or ungrounded, through the use of an appropriate ground lead connected to the ground terminal 21, the meter will read true differential voltage between line or capacitor tap terminals applied between the "A" and "B" probes. As shown in FIG. 4, the second probe connected to the "B" terminal is adapted by virtue of its threaded stud 79 to be mounted on a "hot stick" 74.

Referring specifically to FIG. 9, the circuit there shown, is adapted to be used in the probe construction illustrated in FIG. 6, and is particularly useful for Corona detection and measurement. In this circuit, capacitor 106 constitutes a coupling capacitor having a preferred capacitance range from 8 picofarads to 0.1 microfarads. Capacitor 107 also functions as a coupling capacitor and forms a part of the filter circuit which includes inductor 108. The value of the coupling capacitor 107 may range from 0.01 microfarads to 0.001 microfarads, while the inductive capacity of inductor 108 may range from 80 to 1,000 millihenrys. Inasmuch as Corona effects are more prevalent in high voltage high frequency environments the filter circuit including capacitor 107 and inductor 108 is arranged so that the inductor passes low frequencies to ground, while high frequencies pass through capacitor 107 to the meter input. As before, the tubular shield 94 functions as a ground connection and is directly connected as illustrated best in FIG. 6 to the braided ground conductor of the coaxial cable that connects the probe to the meter input terminal.

From the description above it is apparent that the probes 77 may be used for either high or low voltage, and that they are designed to be mounted on the end of a "hot stick" or directly on the voltmeter structure, and that the internal construction and components is closely shielded by a tubular metal shield surrounded by an insulating outer cover which leaves only the sensing tip assembly 84 exposed for whatever type measurement needs be made. The sensing tip assembly may of course vary according to use. As discussed above, the low voltage probe is provided with an internal overvoltage limiting circuit. Upon being applied to an overvoltage unit for measurement purposes, this overvoltage limiting circuit will immediately bypass the over-voltage away from the sensitive input terminal of the meter. The circuit also includes a frequency limiting circuit which can be varied to reject unwanted frequency bands. Such sensitivity and close shielding of the probe makes it particularly applicable in the measurement of voltages existing on the surface of insulated or semiconductor cable coverings. This capability makes it possible to determine or indicate the internal voltages within the insulated or semiconductor cable without physical contact with the internal conductor. Such capability is particularly useful on sealed cable systems where direct access to the high voltage internal conductor is not possible without disconnecting the cable terminations. Such flexibility in a solid-state high input impedance voltmeter also provides a facility in line-to-ground, line-to-line, and phasing measurements by merely making proper contact on the outer insulated or semiconductor covering. Such limited contact of the insulated or semiconductor cable covering, for instance, permits the detection of internally separated conductors or shields, or ground or shield faults by measuring the voltage differential from point to point resulting from varying current flow. Additionally, the sensitivity and close shielding of the probe makes it particularly applicable for phasing measurements when equal point-to-ground voltage points are used on each cable to measure differential voltage.

Figure 10:
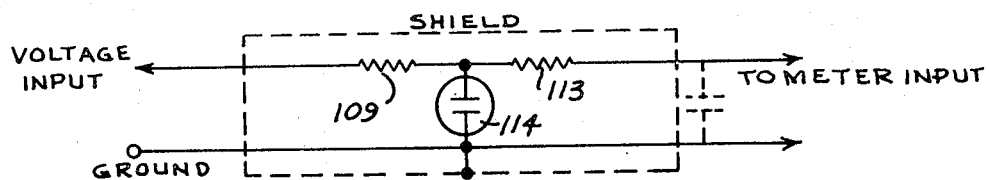
FIG. 10 is a diagrammatic view of a circuit useful for use as a low voltage probe for the measurement of surface voltage in underground cables.
Figure 11:
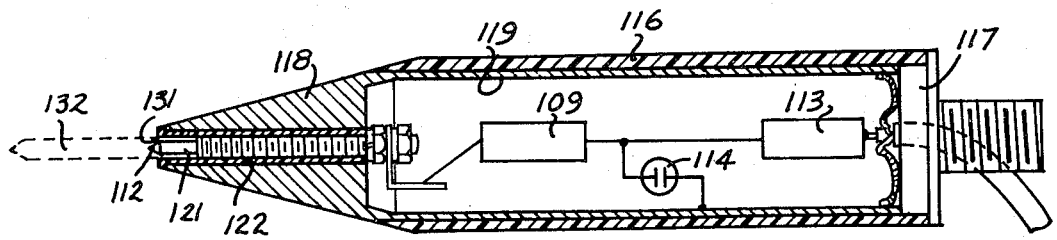
FIG. 11 is a cross-sectional view illustrating the mechanical arrangement of the components illustrated in the circuit of FIG. 10.
Figure 12:
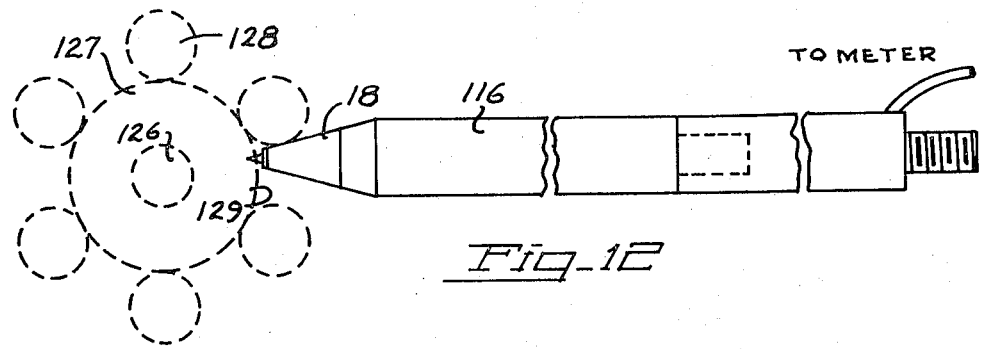
FIG. 12 is a schematic illustration showing the manner in which the probe illustrated in FIG. 11 is utilized to measure the surface voltage of an insulated underground high power high voltage conductor cable.

For use with high voltage cables in which the inner conductor is concentric with a neutral or ground conductor coaxially disposed about the concentric inner conductor and separated therefrom by insulating material, the structure illustrated in FIGS. 10 through 12 is particularly applicable. FIG. 10 illustrates the circuit arrangement in conventional symbols, while FIG. 11 illustrates the mechanical embodiment of the components in a physical structure. FIG. 12 illustrates the manner of use of the probe when measuring the voltage on the surface of the insulation on a high voltage cable. Referring specifically to FIG. 10, the circuit includes a resistor 109 having a value ranging from 0.5 to 1 megohm. The resistor 109 is interposed in the high voltage input circuit between the probe point 112 and the input terminal of the meter. Serially interposed in the same circuit is a second resistor 113 having a value of approximately 200K ohms. Interposed in the circuit between the two resistors and ground is a Neon lamp 114. Neon 114 preferably possesses a low ionization point which breaks down at a low voltage of 50 volts or less. It will thus be seen that any destructive transient voltages that might be imposed upon the probe point 112 are shunted to ground by the Neon lamp before they reach the meter.

Referring to FIG. 11, the structural features of this probe embodiment includes a tubular outer insulating cover 116 closed at one end by a dielectric end cap 117, and being provided at its other end with a projecting metallic conical point 118 as shown. The conical point 118 is provided with a rearwardly extending tubular metallic shield 119 that fits snugly within the inner periphery of the outer dielectric covering. Resistors 109 and 113, and the Neon lamp 114 are positioned wholly within this tubular metallic shield 119. As indicated in FIG. 11, the resistor 109 is connected through an appropriate connection with the probe point 112. It will of course be understood that the outer conductive ground shield of the coaxial cable that connects the probe to the meter is extended within the housing and connected to the ground shield 119.

It will be apparent from FIG. 10, that the short extension 121 immediately behind the conical sensing tip 112 is spaced within a dielectric sleeve member 122 that projects through the conical metallic tip 119. It is the function of this dielectric sleeve to effectively insulate the sensing probe tip 118 from the ground plane formed by the metallic conical point 118 and shield 119. For purposes which will hereinafter ben explained, it is noted that a portion 121 of the probe point or sensing tip is radially spaced inwardly from the surrounding dielectric member 122.

In use, it has been found that the presence of alternating current voltages may be detected or separated when they are as low as 10 millivolts on conductors, voltage gradients in air and on insulators can be detected, or voltages at the surface of or through insulation jackets may also be detected, without requiring actual physical contact with the metallic conductor. To sense the presence of alternating current voltages in instances where a single insulated conductor is present, it is necessary only to press the tip 112 against the outer insulated covering of the conductor and the sensitivity of the probe and meter will register on the meter scale. In instances where a central conductor is provided with an insulating layer which is in turn wrapped by a ground plane consisting of a multiplicity of twisted strands of wire, it is possible to determine the presence of high voltage on the inner conductor by pressing the tip 112 onto the surface of the outer insulator covering, while simultaneously pressing the metal surface of the conical tip 112 against the adjacent ground conductor. Use of the probe in this manner is illustrated in FIG. 12. As there shown, the high voltage inner conductor 126 is surrounded by a layer of insulation or semiconductor material 127. This layer of insulating or semiconductor material is in turn surrounded by a multiplicity of strands 128 of a ground plane or shield. It has been found that by placing the sensing tip 112 against the outer surface 129 of the body of insulating material, while simultaneously pressing the adjacent metallic conical tip 118 against the ground conductor or shield wire 128, the probe in conjunction with the high input impedance voltmeter measures the voltage drop between the jacket or insulating body and the ground wire. If no wire is present, then the probe and meter system will measure the voltage drop between the jacket or semiconductor or insulator covering and ground. It has been found that when the material 127 surrounding the high voltage conductor 126 constitutes a semiconductor material, the manufacturing processes will normally cause a non-conductive skin to form on the outer surface of the semiconductor material. Because of the nature of the sensing tip 112, it is desirable in use to just scratch the surface of such nonconducting film so that the tip 112 penetrates such film and makes direct contact with the semiconductor material underlying the film.

It may be necessary in making some types of measurements to utilize a more prominent input or sensing tip than the tip 112 which as indicated, is closely shielded and projects beyond the metallic conical tip 118 only slightly. For this purpose, the portion 121 of the probe tip is radially spaced inwardly to provide an annular socket 131 surrounding the portion 121 and which will accommodate the relatively thin wall of a tip extension 132. Such extension is illustrated in dash lines in FIG. 11. Such a tip extension is useful for instance in point-to-point ground differential voltage or current measurements, the tip extensions 132 being driven into the ground as desired and pulled out again following completion of the measurements. Because of the extreme high sensitivity and close shielding of the probe, the probe may be utilized also to select insulated energized or differential conductors from a group of such conductors included in a combined twisted run. Such surface insulation voltage measurements have not heretofore been possible with conventional and portable equipment.

It has been found that this high input impedance voltmeter system is so sensitive and accurate it may be used as a direction finder or indicator by merely attaching an unshielded insulated loop probe on the "A" input terminal of the meter. Such a loop probe consists of a length of braided wire, covered with an appropriate insulator, one end of the wire being connected to the ground plane of a standard coaxial connector while the other end of the loop probe is connected to the internal high voltage conductor of the coaxial terminal connector. Such a loop probe possesses a sensitivity such that it will indicate "hot" high voltage lines from several feet away, such as overhead power lines, and will even indicate 115 volt residential wiring contained within non-shielded walls, ceilings and other areas. Through its use, the path of an insulated but unshielded energized conductor can be followed over its entire length even though it is not visible and is contained within a sealed wall.

In the use of any equipment of this type to effect electrical measurements of potentially dangerous circuits, it is desirable to insure the safe and satisfactory operation of the voltmeter and probes before such equipment is put into use. For this purpose, I provide a miniature portable battery-operated high voltage test source or supply for use in conjunction with the voltmeter. This device is shown best in FIG. 13, which illustrates the structural arrangement of some of its components, the electrical interconnection of such components being illustrated best in FIG. 15. Referring specifically to FIG. 13, as there shown, the high voltage test source includes an outer dielectric tubular covering or envelope 136, closed at one end by a dielectric plug 137 which functions also as a mounting block and carries a threaded stud 138 which facilitates mounting the high voltage test source on a suitable support structure. This end of the high voltage test source structure is also provided with a metallic plate 139 that functions as a ground lead for connection as appropriate. Within the tubular outer housing 136 is mounted a battery 141 connected as indicated in the wiring diagram illustrated in FIG. 15. Also mounted within the outer insulating tubular covering 136 is a transformer 142, a Neon lamp 143 which, as indicated in FIGS. 13 and 14, is exposed from the end plug 144. The end plug 144 also serves to rigidly mount an elongated printed circuit board 146 in the manner illustrated. The printed circuit board serves to mount the other components within the tubular outer housing member 136. These other components include a capacitor 147, having a capacitance value of approximately 33 picofarads. As indicated in FIG. 15, capacitor 147 and Neon lamp 143 are interposed between the terminals of transformer winding 147. By interposition of capacitor 148 between the winding segments 149 and 151 of the transformer, and the additional interposition of transistor 152 and capacitor 153, the uni-directional voltage normally secured from battery 141 is converted into alternating current voltage at the high voltage terminal 154. In FIG. 13, this high voltage terminal 154 is shown as the blade of a microswitch 156 which may be reached through an appropriate aperture 157 formed in the end plug 144. For convenience, the high voltage terminal 154 is combined with the turn-on switch illustrated symbolically in FIG. 15.

Serially interposed between the opposed terminal ends of transformer windings 149 and 151 are a pair of resistors 158 and 159, the resistor 158 preferably being of the adjustable type. With regard to values of the various components included in the circuit illustrated in FIG. 15, the transistor 152 is of the PNP variety while capacitors 149 and 153 possess values of 0.001 to 0.05 microfarads and 2 microfarads, respectively. Resistors 158 and 159 possess resistance values of 10K ohms and 3K ohms, respectively. For purposes which will hereinafter be explained, the Neon lamp 143 is surrounded by a ground shield 161 which projects through the end plug 144 and is exposed on the outer face of the end plug as shown best in FIG. 14.

In order to use the high voltage test source to test the proper operation of the high input impedance meter, the high voltage test source is itself first tested in a manner which will hereinafter be explained. After such test, the high voltage test source is mounted on an appropriate "hot stick" through use of threaded stud 138, and the ground terminal 139 thereof is connected through suitable alligator clips to the ground terminal 21 of the voltmeter. The probe 77 has been mounted on the meter, and cable 78 is connected to the "A" input terminal of the meter. The sensing tip 86 of the probe is then inserted through the aperture 157 in end wall 144 of the high voltage test source to actuate the microswitch 156. Actuation of the microswitch will result in activation of the Neon lamp 143, a bright red color indicating approximately 400 volts AC present at the probe tip terminal. A lesser brightness indicates less voltage. If the voltage drops to approximately 60 volts, no light will be visible. With a full brightness condition, it may be assumed that the voltmeter probe assembly is operating normally. If the lamp does not appear full brightness, or does not go on, either there is excessive meter probe leakage or a low battery in the test set.

In addition to the visual indication provided by the lamp, the meter provides a reading of approximately 4 to 5 kv. under normal operation for this test. If the ground lead or probe is open, or if the battery is low in either test set or voltmeter, the meter will read less than expected. If probe high voltage end has excessive leakage, meter will generally read higher than expected unless the low voltage section is also defective, which should then cause it to read low.

As indicated above, it is desirable before utilizing the high voltage test source illustrated in FIGS. 13, 14 and 15 to test the voltmeter illustrated in FIGS. 1 through 5, to test the high voltage test source. Such a test may be made through use of the high voltage megohmmeter and leakage detector illustrated in FIGS. 16 through 18 and designated generally by the numeral 162. As shown diagrammatically in FIG. 18, the high voltage megohmmeter and leakage detector includes a Neon lamp 163 in series circuit with a diode rectifier 164. The diode rectifier 164 cooperates with a capacitor 166 to convert the alternating current test voltage to direct current imposed on an intergrating circuit designated generally by the numeral 167 and including a Neon lamp 168 and a capacitor 169. The integrating circuit 167 also includes a resistor 171 with the output circuit of the high voltage megohmmeter and leakage detector device being provided with a resistor 172. Capacitors 166 and 169 possess values of 0.01 microfarads and 0.1 microfarads, respectively, while resistors 171 and 172 possess values of 10K ohms and 500K ohms, respectively.

The components discussed above in connection with the diagram illustrated in FIG. 18, are mounted in a dielectric housing 173 having a conical tip portion 174 through which extends a sensing tip 176. As shown best in FIG. 16, the interior of the dielectric housing 173 is hollow to provide a chamber 177, into which project the base ends 178 and 179 of Neon lamps 163 and 168, respectively. The outer portions of the Neon lamps extend out of the housing 173 and are visible in a manner which will hereinafter be explained. In the interest of clarity of description and drawing, the interconnecting wires forming the physical circuit interconnecting the components included within the hollow chamber 177 have been omitted, reliance being placed on the interconnection of these components illustrated diagrammatically in FIG. 18. Closing one end of the chamber 177 is a dielectric wall 181 having mounted thereon a resilient and conductive switch blade 182 connected through support screws 183 with the ground plane or terminal of the device. Also mounted on dielectric wall 181 is a high voltage probe or sensor 184 which extends through the wall 181 and is interconnected within the chamber 177 to the Neon lamp 163. Outside the chamber 177, i.e., to the left of the wall 181 as viewed in FIG. 16, the sensor 184 projects for a predetermined length correlated to the depth of the aperture 157 in the end wall 144 of the high voltage test source illustrated in FIG. 13.

It will be noted that the skirt portion 186 illustrated in FIG. 16 is provided with a plurality of diametrically opposite recesses or elongated grooves 187. Additionally, referring to FIG. 13, it will be noted that the end wall 144 of the high voltage test source is secured to the outer barrel or tubular cover 136 by a plurality of circumferentially spaced round-head screws 188. The grooves 187 in the high voltage megohmmeter and leakage detector illustrated in FIG. 16 are proportioned to snugly receive the rounded screwheads 188.

In use, the high voltage test source illustrated in FIG. 13 is mounted on an appropriate "hot stick," or in the alternative, is held in the hand, and the skirt portion 186 of the high voltage megohmmeter and leakage detecter device is slipped over the end of the high voltage test source so that the round-head screws 188 slip into grooves 187. The high voltage megohmmeter is oriented on the high voltage test source so that the sensor 184 projects into the aperture 157 and bears against the switch blade 154, thus actuating the microswitch 156. This will light the Neon lamp 163, thus indicating that the test of the high voltage test source may proceed. It is important to note from an operative standpoint that when the high voltage megohmmeter and leakage detector device has been slipped over the high voltage test source, the ground ring 161 surrounding lamp 143 on the high voltage test source will impinge conductively against the resilient leaf 182, thus providing a ground plane that extends between both devices and is common to both.

To effectively test the proper operation of the high voltage test source illustrated in FIG. 13, with the high voltage megohmmeter and leakage detector mounted on the high voltage test source as previously discussed, a high resistance is interposed between the ground terminal 139 on the high voltage test source and the probe tip 176 on the high voltage megohmmeter. Such interposition of a high ohm resistor between these two terminals will effect activation of the integrating circuit 167, with the result that capacitor 169 will be periodically charged to a predetermined voltage level at which the ionization point of the Neon lamp 168 is exceeded, causing this lamp to flash, thus discharging capacitor 169. The value of the resistance interposed between terminals 139 and 176 determines the repetition rate of such flashes. For instance, a 100 megohm resistor will cause the Neon 168 to flash at the rate of approximately two flashes per second. The interposition of a resistor having a 200 megohm value will cause the lamp 168 to flash at the rate of one flash per second. On the other hand, the interposition of a resistor having a value of 1,000 megohms will cause the lamp 168 to flash only once every 5 seconds.

From the foregoing it will be seen that the high voltage test source will generate either high voltage AC or DC voltages sufficient to indicate even on the higher voltage probes, the transistor oscillator-transformer combination included in the high voltage test source being effective to convert the battery voltage to AC and step it up through the unique and novel transformer action provided by the circuit as shown in FIG. 15. For a high voltage DC output, appropriate rectifiers (not shown) are used, either in a half-wave or multiplying circuit, depending upon the voltage required.

It should also be apparent from the above that the high voltage test source is also useful as a source of power for the solid-state high voltage megohmmeter-leakage detector illustrated in FIGS. 16 through 18. Such high voltage megohmmeter is capable of measuring resistances from below 10 megohms to over 1000 megohms at 500 volts DC or more applied. As explained above, the megohmmeter is unique in that it employs a flashing Neon light activated by an integrating circuit which flashes the lamp in direct proportion to the resistance or inversely proportional to the leakage current. Thus, the unit can indicate DC resistance or leakage current even while an AC conductor is energized, and even at high voltages, by appropriate interposition of series isolating resistors. In conjunction with the high voltage mogohmmeter and leakage detector illustrated in FIG. 16, the high voltage test source is especially useful to detect excessive leakage, currents from contamination of high impedance voltage sources such as cable tap capacitance dividers, typically very low capacitances, in order to allow accurate meter readings. Excessive tap leakage from contamination by dirt, for instance, could cause low voltage readings on a meter which could create an unsafe condition unless detected by the use of the apparatus disclosed above.

Having thus described my invention, what is claimed to be novel and sought to be protected by letters patent is as follows:

I claim:

1. A high input impedance probe for use in conjunction with a high input impedance metering system comprising:
   a. an electrically conductive input terminal adapted to be brought into close proximity or contact with an electrically conductive circuit;
   b. an output terminal adapted for electrical connection to said meter;
   c. a hollow dielectric housing disposed between said input and output terminals and mechanically supporting said input and output terminals in spaced relation;
   d. a capacitor and a resistor serially connected between said input and output terminals within said housing; and
   e. an electrically conductive shield structure surrounding said capacitor and resistor to effectively shield said probe from stray electrical fields;

f. said hollow dielectric housing being provided with a reentrant tubular portion coaxially arranged within the housing, and said shield comprising a metallic tube coaxially disposed between the inner surface of the housing and the reentrant tubular portion, said reentrant tubular portion being supported at one end on the housing and provided with an end wall at its other end, and said capacitor and resistor being supported on said end wall of the reentrant tubular portion.

2. The combination according to claim 1, in which the value of said resistor is at least 20 megohms.

3. The combination according to claim 1, in which a capacitor is interposed between said input circuit and said shield.

4. The combination according to claim 1, in which said resistive circuit includes a second resistor and a capacitor in parallel connection thereto, connected between said input circuit and said shield to provide overvoltage protection for said meter.

* * * * *